US010241900B2

(12) United States Patent
Isman et al.

(10) Patent No.: US 10,241,900 B2
(45) Date of Patent: *Mar. 26, 2019

(54) DATA RECORDS SELECTION

(71) Applicant: Ab Initio Technology LLC, Lexington, MA (US)

(72) Inventors: Marshall A. Isman, Newton, MA (US); Richard A. Epstein, Yarmouth, ME (US); Ralf Haug, Largo, FL (US); Andrew F. Roberts, Melrose, MA (US); John Ralston, Arroyo Grande, CA (US); John L. Richardson, Santa Barbara, CA (US); Justin Pniower, Boston, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/891,794

(22) Filed: Feb. 8, 2018

(65) Prior Publication Data
US 2018/0165181 A1    Jun. 14, 2018

Related U.S. Application Data

(63) Continuation of application No. 13/827,558, filed on Mar. 14, 2013, now Pat. No. 9,892,026.
(Continued)

(51) Int. Cl.
*G06F 16/00*    (2019.01)
*G06F 7/00*    (2006.01)
(Continued)

(52) U.S. Cl.
CPC ........ *G06F 11/3684* (2013.01); *G06F 16/217* (2019.01); *G06F 16/9535* (2019.01)

(58) Field of Classification Search
CPC .. G06F 17/30592; G06Q 10/10; G06Q 10/06; G06Q 10/00
(Continued)

(56) References Cited

U.S. PATENT DOCUMENTS 5,179,643 A    1/1993 Homma et al.
5,742,806 A    4/1998 Reiner et al.
(Continued)

FOREIGN PATENT DOCUMENTS

EP    1302871    4/2003
JP    03-002938    1/1991
(Continued)

OTHER PUBLICATIONS

Alur et al. "IBM Websphere Information Analyzer and Data Quality Assessment", ibm.com/redbooks, Dec. 2007 p. 1-642, Retrieved from the Internet URL:http://www.ibm.com/redbooks/pdfs/sg247508.pdf.
(Continued)

*Primary Examiner* — Usmaan Saeed
*Assistant Examiner* — Raquel Perez-Arroyo
(74) *Attorney, Agent, or Firm* — Fish & Richardson P.C.

(57) ABSTRACT

A computer-implemented method includes accessing a plurality of data records, each data record having a plurality of data fields. The method further includes analyzing values for one or more of the data fields for at least some of the plurality of data records and generating a profile of the plurality of data records based on the analyzing. The method further includes formulating at least one subsetting rule based on the profile; and selecting a subset of data records from the plurality of data records based on the at least one subsetting rule.

32 Claims, 6 Drawing Sheets

Related U.S. Application Data

(60) Provisional application No. 61/759,799, filed on Feb. 1, 2013.

(51) Int. Cl.
  *G06F 11/36* (2006.01)
  *G06F 16/9535* (2019.01)
  *G06F 16/21* (2019.01)

(58) Field of Classification Search
  USPC ............................................. 707/603
  See application file for complete search history.

(56) References Cited

U.S. PATENT DOCUMENTS

| | | | |
|---|---|---|---|
| 5,842,200 A | 11/1998 | Agrawal et al. | |
| 5,845,285 A | 12/1998 | Klein | |
| 5,966,072 A | 10/1999 | Stanfill et al. | |
| 6,134,560 A | 10/2000 | Kliebhan | |
| 6,138,123 A | 10/2000 | Rathbun | |
| 6,163,774 A * | 12/2000 | Lore | G06Q 10/06 |
| | | | 705/36 R |
| 6,343,294 B1 | 1/2002 | Hawley | |
| 6,553,366 B1 | 4/2003 | Miller et al. | |
| 6,601,048 B1 | 7/2003 | Gavan et al. | |
| 6,657,568 B1 | 12/2003 | Coelho et al. | |
| 6,741,995 B1 | 5/2004 | Chen et al. | |
| 6,788,302 B1 | 9/2004 | Ditlow et al. | |
| 6,801,938 B1 | 10/2004 | Bookman et al. | |
| 6,959,300 B1 | 10/2005 | Caldwell et al. | |
| 7,013,290 B2 | 3/2006 | Ananian | |
| 7,047,230 B2 | 5/2006 | Gibbons | |
| 7,058,819 B2 | 6/2006 | Okaue | |
| 7,117,222 B2 | 10/2006 | Santosuosso | |
| 7,376,656 B2 | 5/2008 | Blakeley et al. | |
| 7,403,942 B1 | 7/2008 | Bayliss | |
| 7,433,861 B2 | 10/2008 | Santosuosso | |
| 7,698,163 B2 | 4/2010 | Reed et al. | |
| 7,756,873 B2 | 7/2010 | Gould et al. | |
| 7,813,937 B1 | 10/2010 | Pathria et al. | |
| 7,849,075 B2 | 12/2010 | Gould et al. | |
| 7,958,142 B2 | 6/2011 | Li et al. | |
| 8,145,642 B2 | 3/2012 | Cruanes et al. | |
| 8,296,274 B2 | 10/2012 | Leppard | |
| 8,666,919 B2 * | 3/2014 | Miranda | G06N 5/025 |
| | | | 706/45 |
| 9,336,246 B2 | 5/2016 | Gorelik | |
| 2002/0120602 A1 | 8/2002 | Overbeek et al. | |
| 2002/0161778 A1 | 10/2002 | Linstedt | |
| 2002/0198877 A1 | 12/2002 | Wolff et al. | |
| 2003/0023868 A1 | 1/2003 | Parent | |
| 2003/0033138 A1 | 2/2003 | Bangalore et al. | |
| 2003/0140027 A1 | 7/2003 | Huttel et al. | |
| 2004/0023666 A1 | 2/2004 | Moon et al. | |
| 2004/0049492 A1 * | 3/2004 | Gibbons | G06F 17/30457 |
| 2004/0073534 A1 | 4/2004 | Robson | |
| 2004/0083199 A1 | 4/2004 | Govindugari et al. | |
| 2004/0111410 A1 | 6/2004 | Burgoon et al. | |
| 2004/0181514 A1 | 9/2004 | Santosuosso | |
| 2004/0181533 A1 | 9/2004 | Santosuosso | |
| 2004/0249810 A1 | 12/2004 | Das et al. | |
| 2004/0260711 A1 * | 12/2004 | Chessell | G06F 17/30469 |
| 2005/0048564 A1 | 3/2005 | Emili | |
| 2005/0055369 A1 * | 3/2005 | Gorelik | G06F 17/30292 |
| 2005/0065914 A1 | 3/2005 | Chang et al. | |
| 2005/0071320 A1 * | 3/2005 | Chkodrov | G06F 17/30489 |
| 2005/0102325 A1 | 5/2005 | Gould | |
| 2005/0114368 A1 | 5/2005 | Gould et al. | |
| 2005/0114369 A1 * | 5/2005 | Gould | G06F 17/30466 |
| 2005/0154715 A1 | 7/2005 | Yoaz et al. | |
| 2005/0177578 A1 | 8/2005 | Chen et al. | |
| 2005/0192994 A1 | 9/2005 | Caldwell et al. | |
| 2005/0240354 A1 | 10/2005 | Mamou | |
| 2006/0041544 A1 | 2/2006 | Santosuosso | |
| 2006/0069717 A1 | 3/2006 | Mamou | |
| 2006/0074881 A1 | 4/2006 | Vembu et al. | |
| 2006/0294055 A1 | 12/2006 | Santosuosso | |
| 2007/0050381 A1 | 3/2007 | Hu et al. | |
| 2007/0073721 A1 | 3/2007 | Belyy et al. | |
| 2007/0288490 A1 | 12/2007 | Longshaw | |
| 2007/0299832 A1 | 12/2007 | Chang et al. | |
| 2008/0189269 A1 | 8/2008 | Olsen | |
| 2008/0215602 A1 | 9/2008 | Samson et al. | |
| 2008/0222089 A1 | 9/2008 | Stewart et al. | |
| 2008/0306920 A1 | 12/2008 | Santosuosso | |
| 2009/0216717 A1 | 8/2009 | Suereth et al. | |
| 2009/0226916 A1 | 9/2009 | DeSimas | |
| 2010/0057777 A1 | 3/2010 | Williamson | |
| 2010/0114976 A1 | 5/2010 | Castellanos | |
| 2010/0250563 A1 | 9/2010 | Wu et al. | |
| 2011/0029478 A1 | 2/2011 | Broeker | |
| 2011/0040874 A1 * | 2/2011 | Dugatkin | H04L 41/00 |
| | | | 709/224 |
| 2011/0066602 A1 | 3/2011 | Studer et al. | |
| 2011/0119221 A1 | 5/2011 | Mishra | |
| 2011/0137940 A1 | 6/2011 | Gradin | |
| 2011/0153667 A1 | 6/2011 | Parmeter et al. | |
| 2011/0225191 A1 | 9/2011 | Xie | |
| 2011/0313979 A1 | 12/2011 | Roberts | |
| 2012/0197887 A1 | 8/2012 | Anderson | |
| 2012/0281012 A1 | 11/2012 | Neway | |
| 2012/0323927 A1 | 12/2012 | Froemmgen | |
| 2013/0024430 A1 | 1/2013 | Gorelik | |
| 2013/0159353 A1 * | 6/2013 | Fuh | G06F 11/3672 |
| | | | 707/803 |
| 2013/0166576 A1 | 6/2013 | Hudzia et al. | |
| 2014/0095233 A1 * | 4/2014 | Yeung | G06Q 10/06375 |
| | | | 705/7.12 |
| 2014/0222752 A1 | 8/2014 | Isman | |

FOREIGN PATENT DOCUMENTS

| | | |
|---|---|---|
| JP | H07-502617 | 3/1995 |
| JP | 08-030637 | 2/1996 |
| JP | 10-055367 | 2/1998 |
| JP | 10-091633 | 4/1998 |
| JP | 10-320423 | 12/1998 |
| JP | 11-238065 | 8/1999 |
| JP | 2001-43237 | 2/2001 |
| JP | 2002-024262 | 1/2002 |
| WO | WO 00/57312 | 9/2000 |
| WO | WO 00/79415 | 12/2000 |
| WO | WO 03/071450 | 8/2003 |
| WO | WO 2005/029369 | 3/2005 |

OTHER PUBLICATIONS

Apte, Chidanand, et al., "Business Application for Data Mining," Aug. 2002, Communications of the ACM, vol. 45, No. 8, pp. 49-53.
"Ascential" http://www.ascentialsoftware.com (2003).
"Avellino" http://www.avellino.com (2003).
Bagchi et al.. "Dependency Interference Algorithms for Relational Database Design." *Computers in Industry* 14 (1990) 319-350.
Bell et al.. "Discovery of Data Dependencies in Relational Databases." LS-8 Report 14, Dortmund, Apr. 3, 1995 1-18.
Bell et al.. "Discovery of Data Dependencies in Relational Databases" *Research Reports of the Unit No. VIII (AI), Computer Science Department of Dortmund,* DE, Apr. 1995, pp. 1-18.
Bitton et al.. "A Feasibility and Performance Study of Dependency Inference." Department of Electrical Engineering and Computer Science, University of Illinois at Chicago (1989) 635-641.
Brown et al., "BHUNT: Automatic Discovery of Fuzzy Algebraic Constraints in Relational Data" 29th VLDB Conference, Sep. 9, 2003, XP-002333907.
Bruno et al.. "Efficient Creation of Statistics over Query Expressions." The Computer Society (2003) 201-212.
Chaudhuri, S., "An Overview of Query Optimization in Relational Systems", XP-000782631, pp. 34-43 (1998).
Dasu et al. "Mining Database Structure; Or, How to Build a Data Quality Browser." ACM SIGMOD 2002 Conference, Jun. 4, 2002, XP-002333902, 240-251.

(56) References Cited

OTHER PUBLICATIONS

"Data Profiling: The Foundation for Data Management", prepared by DataFlux Corporation, XP-002313258, (2004).
"Evoke", http://www.evokesoftware.com, (2003).
USPTO Non-Final Office Action issued for U.S. Appl. No. 10/941,401, dated Jul. 21, 2009, 32 pages.
Examination Report in Canadian Application No. 2,655,735 dated May 4, 2009, 2 pages.
Examination Report in Canadian Application No. 2,655,731 dated Dec. 3, 2009, 3 pages.
Examiner's Report in Australian Application No. 2009200294, dated Jun. 12, 2012, 3 pages.
Florescu, Daniela et al., "A Performance Evaluation of Alternative Mapping Schemes for Storing XML Data in a Relational Database," May 1999, http://www.caravel.inria.fr/Fmbrepubs_dana.html, 31 pages.
Graefe, Goetz. "Query Evaluation Techniques for Large Databases." ACM Computing Surveys, vol. 25, No. 2, Jun. 1993, 98 pages.
Henrard et al.. "Data Dependency Elicitation in Database Reverse Engineering." Institut d'Informattique, University of Namur, Belgium, (2001), 11-19.
Huhtala, Y. et al., "Efficient Discovery of Functional and Approximate Dependencies Using Partitions (Extended Version)," University of Helsinki, Department of Computer Science Series of Publications C, Report C-1997-79, Nov. 1997.
Florescu, Daniela et al., "A Performance Evaluation of Alternative Mapping Schemes for Storing XML Data in a Relational Database," May 1999, http://www.caravel.inria.fr/Fmbrepubs_dana.html, 31 pagess.
Huhtala, Y. et al., "Efficient Discovery of Functional and Approximate Dependencies Using Paritions," Proceedings of the 14th International Conference on Data Engineering, Feb. 23-27, 1998, pp. 392-401.
Huhtala et al., "TANE: An Efficient Algorithm for Discovering Functional and Approximate Dependencies", The Computer Journal, vol. 42, No. 2 (1999).
IBM "Profiling: Take the First Step Toward Assuring Data Quality," white paper, GC-18-9728-00, Dec. 2005.
International Search Report & Written Opinion, PCT/US2012/022905, dated May 2, 2012, 12 pages.
International Search Report & Written Opinion, PCT/US2013/053351, dated Oct. 25, 2013, 10 pages.
International Search Report & Written Opinion, PCT/2014/014186, dated Aug. 20, 2014, 13 pages.
International Search Report & Written Opinion, PCTUS2015/011518, dated May 12, 2015, (14 pages).
International Preliminary Report on Patentability in PCT/US2015/011518, dated Jul. 19, 2016 (10 pages).
Jaedicke, et al., On Parallel Processing of Aggregate and Scalar Functions in Object-Relational DBMS, XP-002313223, pp. 379-389 (1998).
Jahnke et al.. "Adaptive Tool Support for Database Reverse Engineering." AG-Softwaretechnik, Universität Paderborn, Germany (19990, 278-282.
Japanese Office Action, application No. 2010-153799, dated Feb. 12, 2013, 4 pages.
Johnson, T et al., "Comparing Massive High-Dimensional Data Sets," Proceedings of the 4th International Conference on Knowledge Discovery and Data Mining (KDD 98), Aug. 27-31, 1998, pp. 229-233.
Kandel et al. "Profiler: Integrated Statistical Analysis and Visualization for Data Quality Assessment" *AVI '12 Proceedings of the International Working Conference on Advanced Visual Interfaces*, pp. 1-8, May 2012.
Kivinen, J and H. Mannila, "Approximate Inference of Functional Dependencies from Relations," Theoretical Computer Science, vol. 149, Sep. 18, 1995, pp. 129-149.
Kouris I N et al. "Using Information Retrieval Techniques for Supporting Data Mining" Data & Knowledge Engineering, Elsevier BC, NL, vol. 52, No. 3, Mar. 2005, pp. 353-383.
Lee, Kyong-Ha et al., "Bitmap Indexes for Relational XML Twig Query Processing," OIKM '09, Nov. 2-6, 2009, 10 pages.
Lemire et al. "Sorting Improves Word-Aligned Bitmap Indexes" *Data & Knowledge Engineering*, Dec. 2009, pp. 1-43.
Li et al., "A Practical External Sort for Shared Disk MPPs", http://www.thearling.com/text/sc93/sc93.
Lopes, S. et al., "Efficient Discovery of Functional Dependencies and Armstrong Relations," Proceedings of the 7th International Conference on Extending Database Technology (EDBT 2000), LNCS 1777, Mar. 27-31, 2000, pp. 350-364.
Mannila, Heikki, "Theoretical Frameworks for Data Mining," Jan. 2000, SIGKDD Explorations, vol. 1, No. 2, pp. 30-32.
Milne, Robert et al., "Predicting Paper Making Defects On-line Using Data Mining," Jul. 24, 1998, Knowledge-Based Systems, vol. 11, pp. 331-338.
Munakata, Koichi, "Integration of Distributed Heterogeneous Information Sources," with English Translation. Systems, Control and Information, Japan, The Institute of Systems, Control and Information Engineers, Dec. 15, 1996, vol. 40, No. 12, pp. 514-521.
Notification of Reason(s) for Refusal in Japanese Patent Application No. 2006-526986, dated Oct. 13, 2010, 3 pages.
Novelli, N. et al., "FUN: An Efficient Algorithm for Mining Functional and Embedded Dependencies," Proceedings of the 8th International Conference on Database Theory (ICDT 2001), LNCS 1973, Jan. 4-6, 2001, pp. 189-203.
Office Action issued in Japanese Application No. 2010-153799, English Translation included, dated May 8, 2012, 6 pages.
Office Action issued in Japanese Application No. 2010-153800, English Translation included, dated May 8, 2012, 5 pages.
Office Action issued in Japanese Application No. 2006-526986, English Translation included, dated Nov. 22, 2012, 61 pages.
Olson, "Know Your Data: Data Profiling Solutions for Today's Hot Projects", XP-002313222, p. 1-4, published in DM Review, printed from DMReview.com (Mar. 2000).
Petit et al., "Towards the Reverse Engineering of Denormalizes Relational Databases." Laboratoire d'Ingénierie des Systeèmes d'Information, Lyon (1996), 218-227.
Rahm, et al., "Data Cleaning: Problems and Current Approaches", XP-002284896 (2000).
Summons to attend oral proceedings pursuant to Rule 115(a) EPC in EP application No. 04784113.5, dated Jul. 30, 2010, 8 pages.
Wyss et al.. "FastFDs: A Heuristic-Driven, Depth-First Algorithm for Mining Functional Dependencies from Relation Instances." (Extended Abstract) Computer Science Department, Indiana University XP-002333906 101-110.
Yan, Men in, et al., "Algorithm for discovering multivalued dependencies," Nov. 5-10, 2001, ACM Proceedings of the 10th International Conference on Information and Knowledge Management, pp. 556-558.
Yao, H. et al., "FD_Mine: Discovering Functional Dependencies in a Database Using Equivalences," University of Regina, Department of Computer Science, Technical Report TR 2002-04, Aug. 2002.
Yao, H. et al., "FD_Mine: Discovering Functional Dependencies in a Database Using Equivalencies," Proceedings of the 2nd IEEE International Conference on Data Mining, Dec. 9-12, 2002, pp. 729-732.
Yao, Hong et al., "Mining functional dependencies from data," Sep. 15, 2007, Springer Science-Business Media, Data Mining and Knowledge Discovery, vol. 16, No. 2, pp. 197-219.
Yoon, Jong P., et al., "BitCube: A Three-Dimensional Bitmap Indexing for XML Documents," Journal of Intelligent Information Systems, Dec. 2001, 17:2/3, pp. 241-254.
Japanese Office Action (English translation), application No. 2013-551372, dated Oct. 27, 2015 (3 pages).
Chinese Office Action, application No. 201210367944.3, dated Nov. 4, 2015 (r pages.
Olson, Jack E. Data Profiling Technology, Chapters 7 and 8) (23 pages) Jan. 2003.
Chinese First Office Action (English translation), application No. 201210367944.3, dated Mar. 27, 2015 (5 pages).

(56) References Cited

OTHER PUBLICATIONS

European Search Report in Application No. 147462915, dated Sep. 5, 2016 (4 pages).
Mobasher, "Data Mining for Web Personalization", The Adaptive Web; LNCS 4321, pp. 90-135, 2007.
Gauch et al., "User Profiles for Personalized Information Access", The Adaptive Web, LNCS 4321, pp. 54-89, 2007.
Young et al., "A Fast and Stable Incremental Clustering Algorithm." 2010 Seventh International Conference on Information Technology pp. 204-209.
U.S. Appl. No. 10/941,402, filed Sep. 15, 2004, Data Profiling.
U.S. Appl. No. 10/941,373 U.S. Pat. No. 7,849,075, filed Sep. 15, 2004 Dec. 7, 2010, Joint Field Profiling.
U.S. Appl. No. 10/941,401 U.S. Pat. No. 7,736,873, filed Sep. 15, 2004 Jul. 13, 2010, Functional Dependency Data Profiling.
U.S. Appl. No. 13/957,641, filed Aug. 2, 2013, Profiling Data With Source Tracking.
U.S. Appl. No. 13/958,057, filed Aug. 2, 2013, Profiling Data With Location Information.
U.S. Appl. No. 14/059,590, filed Oct. 22, 2013, Profiling Data With Location Information.
U.S. Appl. No. 13/957,664, filed Aug. 2, 2013. Characterizing Data Sources in a Data Storage System.

\* cited by examiner

| Chat ID | Address | State | Zip | Income | Gender | Total Int |
|---|---|---|---|---|---|---|
| 254a | 254b | 254c | 254d | 254e | 254f | 254g |
| | 12 Main St. | NY | 10001 | $45,000 | F | Low |
| | 1 Elm St. | MA | 02130 | $98,000 | M | Medium |
| | 478 1st Ave. | MA | 02138 | $15,000 | F | Low |
| | 3897 Rte. 9 | CT | 06340 | $79,000 | M | Medium |
| | 287 Oak Ave. | NH | 03305 | $115,000 | F | Medium |
| | 12 Beech St. | NJ | 07306 | $24,000 | M | Low |
| | 11 2nd St. | NY | 10021 | $86,000 | F | Medium |
| | 114 Central Blvd. | MA | 02210 | $78,000 | F | Medium |
| | 27 E St. | PA | 19019 | $223,000 | F | High |
| | 98 Pine Rd. | CA | 94035 | $24,000 | M | Low |
| | 2135 Lake St. | NY | 10025 | $112,000 | F | Medium |
| | 46 Washington St. | VT | 05401 | $99,000 | M | Medium |
| | 235 2nd Ave. | MA | 02138 | $33,000 | M | Low |
| | 354 Maple Ave. | CT | 06101 | $160,000 | F | High |
| | 45 Cedar St. | RI | 02904 | $77,000 | M | Medium |
| | 14 Hill St. | MA | 02210 | $45,000 | M | Low |
| | 878 Park St. | NH | 03301 | $68,000 | F | Medium |

FIG. 2B

DATA RECORDS SELECTION

CLAIM OF PRIORITY

This application is a continuation of U.S. application Ser. No. 13/827,558, filed on Mar. 14, 2013, which claims priority to U.S. Patent Application Ser. No. 61/759,799, filed on Feb. 1, 2013, the contents of both of which are incorporated here by reference in their entirety.

BACKGROUND

Stored data sets often include data for which various characteristics are not known beforehand. For example, ranges of values of typical values for a data set, relationships between different fields within the data set, or functional dependencies among values in different fields, may be unknown. Data profiling can involve examining a source of a data set in order to determine such characteristics.

SUMMARY

During development of data processing applications, developers may work outside a production environment and may not have access to production data. To ensure that a data processing application (referred to herein as an "application") will execute appropriately in production with actual data, realistic data may be used during execution and testing of the application. Applications often include rules whose execution depends on the value of one or more variables. These variables may be input variables corresponding to input data, may be derived variables that depend on one or more input variables, etc. A subset of data records can be selected from actual production data to be used for development and testing of the application. These data records are generally selected such that the input data is sufficient for every rule in the application to be executed (e.g., such that complete code coverage in the application is achieved).

In a general aspect, a computer-implemented method includes accessing a plurality of data records, each data record having a plurality of data fields. The method further includes analyzing values for one or more of the data fields for at least some of the plurality of data records and generating a profile of the plurality of data records based on the analyzing. The method further includes formulating at least one subsetting rule based on the profile; and selecting a subset of data records from the plurality of data records based on the at least one subsetting rule.

Embodiments may include one or more of the following.

Formulating at least one subsetting rule includes identifying a first data field as a target data field based on a cardinality of the first data field. In some cases, the target data field has a set of distinct values in the plurality of data records, and wherein selecting a subset of data records includes selecting data records such that there is at least one data record in the selected subset that has each of the distinct values for the target data field.

Generating a profile includes classifying values for a first data field in the plurality of data records. Formulating at least one subsetting rule includes identifying the first data field as a target data field based on the classifying. In some cases, the target field has a set of distinct values in the plurality of data records, and wherein selecting a subset of data records includes selecting data records such that there is at least one data record in the selected subset that has each of the distinct values for the target data field.

Formulating at least one subsetting rule includes identifying a first data field as a first target data field and a second data field as a second target data field. In some cases, selecting a subset of data records includes selecting the subset of data records based on combinations of a first set of distinct values for the first target data field and a second set of distinct values for the second target data field.

Generating a profile includes identifying a relationship between data records related via values of a first data field. The at least one subsetting rule includes an identification of the relationship. In some cases, selecting a subset of data records includes selecting a first data record; and selecting one or more second data records related to the first data record via the relationship identified in the subsetting rule. In some cases, the relationship between data records includes a relationship between data records in a first set of data records and data records in a second set of data records.

Generating a profile includes generating a pseudofield for at least some of the plurality of data records; and populating the pseudofield for each corresponding data record with an accumulated value. The accumulated value for a first data record is determined based on the first data record and at least one other data record related to the first data record. The first data record and the at least one other data record are related via values of a first data field. In some cases, the method includes determining the accumulated value based on a sum of a value for a second data field of the first data record and values for the second data field for each other related data record.

The method includes receiving a subsetting rule.

The method includes providing the selected subset of data records to a data processing application. In some cases, the method includes formulating a second subsetting rule based on results of the data processing application; and selecting a second subset of data records based on based on the second subsetting rule.

In a general aspect, software stored on a computer-readable medium includes instructions for causing a computing system to access a plurality of data records, each data record having a plurality of data fields. The software includes instructions for causing the computing system to analyze values for one or more of the data fields for at least some of the plurality of data records; and generate a profile of the plurality of data records based on the analyzing. The software also includes instructions for causing the computing system to formulate at least one subsetting rule based on the profile; and select a subset of data records from the plurality of data records based on the at least one subsetting rule.

In a general aspect, a computing system includes at least one processor configured to access a plurality of data records, each data record having a plurality of data fields. The processor is configured to analyze values for one or more of the data fields for at least some of the plurality of data records and generate a profile of the plurality of data records based on the analyzing. The processor is also configured to formulate at least one subsetting rule based on the profile; and select a subset of data records from the plurality of data records based on the at least one subsetting rule.

In a general aspect, a computing system includes means for accessing a plurality of data records, each data record having a plurality of data fields. The computing system includes means for analyzing values for one or more of the data fields for at least some of the plurality of data records; and means for generating a profile of the plurality of data records based on the analyzing. The computing system also includes means for formulating at least one subsetting rule based on the profile; and means for selecting a subset of data records from the plurality of data records based on the at least one subsetting rule.

In a general aspect, a computer-implemented method includes accessing a plurality of data records, each data record having a plurality of data fields, and selecting a first subset of data records from the plurality of data records. The method includes providing the first subset of data records to a data processing application that implements a plurality of rules and receiving a report indicative of a number of times at least one of the rules was executed by the data processing application. The method includes, based on the report, selecting a second subset of data records from the plurality of data records.

Embodiments may include one or more of the following.

The method includes providing the second subset of data records to the data processing application.

The method includes, based on the report, identifying one or more unexecuted rules that were not executed by the data processing application. Selecting the second subset of data records includes selecting data records based on the identifying.

The method includes, based on the report, identifying one or more rules that were each executed less than a corresponding maximum number of times. Selecting the second subset of data records includes selecting data records based on the identifying.

The method includes, based on the report, identifying one or more rules that were each executed more than a corresponding minimum threshold number of times. Selecting the second subset of data records includes selecting data records based on the identifying.

Selecting a first subset of data records includes selecting the first subset of data records based on a first subsetting rule. In some cases, selecting the first subset of data records based on the first subsetting rule includes selecting the first subset of data records such that at least one data record in the subset has each of a set of distinct values for a target data field. In some cases, selecting the first subset of data records based on the first subsetting rule includes selecting a first data record and selecting one or more second data records related to the first data record via a relationship identified in the first subsetting rule. In some cases, selecting the second subset of data records includes selecting the second subset of data records based on a second subsetting rule different from the first subsetting rule.

The report includes data indicative of a value of a variable that triggers execution of one or more rules of the data processing application. The method includes identifying one or more data fields as target data fields based on the variable, wherein the variable depends on a value of the identified one or more data fields.

The second subset of data records includes the first subset of data records.

The method includes iteratively selecting a subset of data records and providing the subset of data records to the data processing application until the report indicates that at least a threshold number of rules were executed by the data processing application.

In a general aspect, software stored on a computer-readable medium includes instructions for causing a computing system to access a plurality of data records, each data record having a plurality of data fields, and to select a first subset of data records from the plurality of data records. The software includes instructions for causing the computing system provide the first subset of data records to a data processing application that implements a plurality of rules and receive a report indicative of a number of times at least one of the rules was executed by the data processing application. the software includes instructions for causing the computing system to, based on the report, select a second subset of data records from the plurality of data records.

In a general aspect, a computing system includes at least one processor configured to access a plurality of data records, each data record having a plurality of data fields, and select a first subset of data records from the plurality of data records. The processor is configured to provide the first subset of data records to a data processing application that implements a plurality of rules and receive a report indicative of a number of times at least one of the rules was executed by the data processing application. The processor is configured to, based on the report, select a second subset of data records from the plurality of data records.

In a general aspect, a computing system includes means for accessing a plurality of data records, each data record having a plurality of data fields and means for selecting a first subset of data records from the plurality of data records. The computing system includes means for providing the first subset of data records to a data processing application that implements a plurality of rules and means for receiving a report indicative of a number of times at least one of the rules was executed by the data processing application. The computing system includes means for, based on the report, selecting a second subset of data records from the plurality of data records.

The techniques described herein have may have one or more of the following advantages. For instance, a complete set of production data records may be massive, and testing a data processing application with such a large set of records can be slow and impractical. By using only a subset of data records selected to be representative of features of the complete set of data records that are relevant to the operation of the data processing application, thorough and efficient testing can be achieved. Accurate selection of a minimum number of data records for effective testing of the application can be achieved via automated profiling analysis of the complete set of data records and feedback from execution of the data processing application.

Other features and advantages are apparent from the following description and from the claims.

BRIEF DESCRIPTION OF DRAWINGS

FIG. 2B is a small portion of an example set of demographic records.

DETAILED DESCRIPTION

Figure 1:
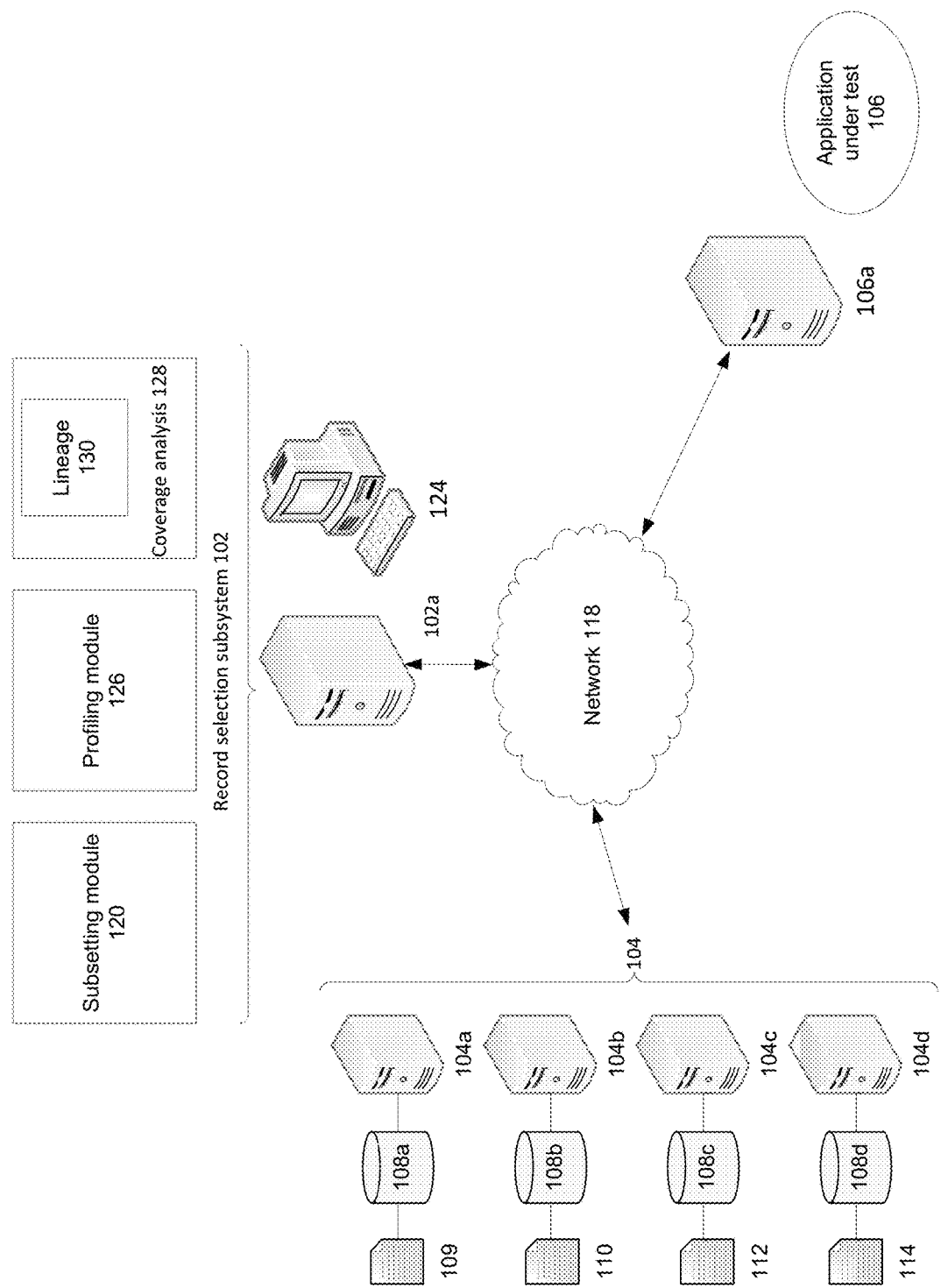
FIG. 1 is a block diagram of a data processing system.

During development of data processing applications, developers may work outside of a production environment and may not have access to actual production data. To ensure that a data processing application will execute appropriately in production with actual data, realistic data may be used during development and testing of the application. Applications often implement rules whose execution depends on (e.g., is triggered by) the value of one or more variables. These variables may be input variables corresponding to input data, may be derived variables that depend on one or more input variables, etc. For effective testing of the application, input data can be provided that is sufficient to cause every logic rule in the application to be executed (e.g., such that complete code coverage in the application is achieved), such that every logic rule is executed at least a corresponding minimum number of times, and/or such that every logic rule is executed no more than a corresponding maximum number of times.

A subset of data records to be provided to the application is typically selected from one or more larger sets of data records (e.g., from sets of actual production data). The subset may be selected based on subsetting rules, which may be specified by a user, formulated based on a profiling analysis of the data records, formulated based on feedback from execution of an application, etc. For instance, data records that include data that may cause some or all of the rules of the application under test to be executed may be selected for the subset.

The selected data records are provided to an application, which executes using the selected data records as input data. The application implements one or more rules, i.e., each rule implemented by the application can be executed by the application when a corresponding condition expression for the rule is satisfied and is not executed by the application if the corresponding condition expression is not satisfied. A rule is specified by a specification that includes at least a condition expression and an execution expression. When the condition expression is satisfied (e.g., the condition expression is evaluated with a true result), the execution expression is evaluated. The condition expression may depend on (e.g., is triggered by) the value of one or more variables, which may be input variables corresponding to input data, may be derived variables that depend on one or more input variables, etc. In some examples, the application executes all of the rules that are triggered. In some examples, the application executes fewer than all of the rules that are triggered, such as some of the rules or only one of the rules (e.g., a first rule that is triggered). Rules are described in more detail at least at col. 5, line 61-col. 6, line 11 of U.S. Pat. No. 8,069,129, filed Apr. 10, 2007, the contents of which are incorporated herein by reference in their entirety.

After execution, a report can be provided which contains data indicative of the execution of the application (e.g., rules in the application did or did not execute, a number of times each logic rule in the application was executed, or other execution data). Based on the report, additional input data may be identified, e.g., input data that would have caused the unexecuted rules to be executed, input data that would have caused a particular logic rule to be executed a specified number of times, or input data that would have caused another desired execution result. Corrective action can be executed, for example, additional subsetting rules can be formulated and an updated subset of data records can be selected according to those additional subsetting rules. The updated subset of data records may include data records sufficient to cause execution of some or all of the previously unexecuted rules, data records sufficient to cause execution of some or all of the rules a specified number of times, or data records sufficient to cause another desired execution result.

Referring to FIG. 1, a data processing system 100 includes a record selection subsystem 102 hosted on a server 102a. The record selection subsystem 102 selects data records from one or more sets of data records (e.g., production data records). The selected data records are provided to a data processing application 106, e.g., an application that is undergoing testing or development. In some examples, the application 106 is local to the record selection subsystem 102, for example, hosted on the same server 102a. In some examples, the application 106 may be remote to the record selection subsystem 102, for example, hosted on a remote server 106a that is accessed over one or more networks such as a local or wide area data network 118 (e.g., the Internet).

The data records are stored in data sources 104 hosted by one or more servers 104a, 104b, 104c, 104d and corresponding storage devices 108a, 108b, 108c, 108d. The data sources 104 may include any of a variety of data sources, such as a database 109, a spreadsheet file 110, a text file 112, a native format file 114 used by a mainframe, or another type of data source. One or more of the data sources may be local to the record selection subsystem 102, for example, hosted on the same computer system (e.g., server 102a). One or more of the data sources may be remote to the record selection subsystem 102, for example, hosted on a remote computer (e.g., servers 104a, 104b, 104c, 104d) that is accessed over the network 118, multiple networks, etc.

The data records stored in data sources 104 include one or more sets of data records. For example, the data records may include customer transaction records, customer demographic records, financial transaction records, telecommunications data, or other types of data records. Each data record has one or more data fields, and each data field has a particular value (or lack thereof) for each data record, such as a numerical value, an alphanumeric value, a null value, etc. For instance, in a set of customer transaction records, each record may have data fields storing a customer identifier, a purchase price, and a transaction type, among other data.

A subsetting module 120 in the record selection subsystem 102 may provide various operations such as selecting a subset of data records from one or more sets of data records stored in one or more of the data sources 104 according to one or more subsetting rules. A subsetting rule is a rule, executable by a computer, by which a subset of data records from the one or more sets of data records is to be selected. The subsetting rules may be formulated by the subsetting module 120 based on an analysis of a profile of the one or more sets of data records generated by a profiling module 126. The subsetting rules may also be formulated by the subsetting module 120 based on an analysis of the results of the execution of the application provided by a coverage analysis module 128 (e.g., based on the report). The subsetting rules may be specified by a user via a user interface 124, e.g., based on the user's understanding of the data records and/or the application 106 under test. The subsetting rules may also be read from a storage medium, such as a hard disk, or received via a network, such as the Internet.

A wide variety of subsetting rules are possible and may be applied alone or in combination. Subsetting rules can be deterministic (e.g., the rule may specify that all records matching a particular criterion are to be selected) or non-deterministic (e.g., the rule may specify that, of all the records that match a particular criterion, two of those records are to be selected at random).

In some examples, a subsetting rule designates one or more target data fields and specifies that each distinct value or value classification for the target data fields is to be included in at least one of the data records of the selected subset of data records. The subsetting module 120 identifies each distinct value for the target data fields in the one or more sets of data records and selects data records to satisfy the subsetting rule. For instance, a state data field, which has a distinct value for each of the fifty states, and a gender data field, which has two distinct values may be identified as target data fields. Data records are selected for the subset such that each of the fifty values for state and each of the two values for gender are included in at least one data record in the subset.

In some examples, a subsetting rule specifies a type of relationship among data records within the same set of data records or between different sets of data records. The subsetting module 120 selects data records based on their relationship with other data records selected for the subset. For instance, data records that share a common value for a customer identifier (cust_id) data field may be selected for the subset. Other examples of subsetting rules are also possible, such as filtering. In some examples, a combination of subsetting rules can be used to select data records for the subset.

In some examples, subsetting rules are provided by a user, such as a data analyst or an application developer. For instance, a user may identify target fields, specify relationships among data records, or otherwise indicate a subsetting rule.

In some examples, subsetting rules are formulated by the subsetting module 120 based on an analysis of a profile of the data records automatically generated by the profiling module 126. The profiling module 126 may access the one or more sets of data records and generate a profile of the data records by analyzing individual data records of a single data set and/or analyzing relationships among data fields within a set of data records and/or across different sets of data records.

A profile of a set of data records is a summary, e.g., on a field-by-field basis, of data in the set of data records. A profile can include information characterizing the data in the set of data records, such as a cardinality of one or more of the data fields in the data records, a classification of values in one or more of the data fields, relationships among data fields in individual data records, relationships among data records, or other information characterizing the data in the set of data records. A profile of a set of data records may also include information characterizing a pseudofield, which is a data field generated by the profiling module 126 and populated with values determined by manipulation of values for one or more data fields in related data records.

Based on the generated profile of the data records, the subsetting module 120 may identify features of the data records that may be relevant to the selection of a subset of data records that achieves good code coverage for the application 106. For instance, based on the profile of the data records, the subsetting module 120 may identify one or more data fields or combinations of data fields that are likely to relate to the input variables and derived variables of the application. In some cases, subsetting rules may also be formulated based on input received from a user or from a computer storage medium and/or based on results of execution of the application 106 (e.g., based on input received from a coverage analysis module 128).

The subsetting module 120 may execute operations for one or more types of analysis to specify subsetting rules. The subsetting module 120 may specify one or more subsetting rules based on an analysis of the data fields within individual data records, e.g., by determining which data fields are likely to relate to variables in the application 106. In some examples, the subsetting module 120 identifies a target data field based on the cardinality of the target data field as indicated in the profile (i.e., the number of distinct values or classifications of values for the data field across all of the data records of a set). For instance, a gender data field (with a cardinality of two) may be identified as a target data field while a phone_number data field (with a cardinality on the order of the total number of data records) is not likely to be identified as a target data field. In some examples, subsetting module 120 identifies as a target data field a pseudofield populated with data resulting from a manipulation of data in one or more data fields. For instance, data in an income data field may be classified into categories (e.g., high, medium, or low), and a pseudofield populated with the classifications of the income data field (inc_range) may be identified as a target data field. In some examples, the subsetting module 120 identifies a target data field based on relationships between the target data field and one or more other data fields within the same record as indicated in the profile. For instance, the profile may indicate that the data fields state and ZIP are not independent; based on this dependence, the subsetting module 120 may consider only one of those data fields as a possible target data field. The subsetting module 120 may also specify one or more subsetting rules based on an analysis of relationships among different data records within a set of data records and/or across different sets of data records as indicated in the profile. For instance, the profile may indicate that data records may be linked via a common value of a data field (e.g., the value of a cust_id data field). Other analyses of the data records are also possible.

Once a subset of data records is selected by the subsetting module 120, data indicative of the selected subset of data records are provided to the application 106 under test. For instance, identifiers for the selected subset of data records and an address for the data records may be provided to the application 106. A file containing the selected subset of data records may also be provided to the application 106.

The data processing application 106 is executed using the subset of data records as input data. After execution, a report is provided to a coverage analysis module 128 in the record selection subsystem 102. The report may also be provided to the user 122. The report contains data indicative of the execution of the application (e.g., rules in the application that did or did not execute, a number of times each logic rule in the application was executed, or other execution data). In some examples, the report directly identifies those rules that did or did not execute. The report may also contain additional information about the execution of the application 106, such as a number of times each logic rule was executed, a value of each variable of the application during execution, or other information.

For each logic rule in the application that did not execute, the coverage analysis module 128 identifies one or more variables of the application 106 that relate to that logic rule. The coverage analysis module 128 may identify variables based on data included in the report (e.g., data indicative of the flow of data through the application 106), based on preloaded information about the application, etc. In some cases, the coverage analysis module 128 also identifies a value or range of values for each variable that would have caused the logic rule to execute. The input data fields and values or ranges of values that correspond to the variables are identified and used to specify additional subsetting rules in subsequent selection of an updated subset of data records by the subsetting module 120.

For example, if an identified variable is an input variable of the application that directly corresponds to one of the data fields of the data records, the coverage analysis module 128 identifies the corresponding data field and a value or range of values for the data field. For example, if a logic rule in the application 106 executes when a variable x is greater than 10, and the variable x corresponds to an input data field txn_amt containing data about the amount of a customer transaction, the coverage analysis module determines that the input data should include at least one data record for which txn_amt>10. This determination (e.g., txn_amt>10) is provided to the subsetting module 120, which specifies an additional subsetting rule such that subsequent subsets of data records provided to the application 106 will include data sufficient to cause the x>10 logic rule to execute.

For example, if an identified variable is not an input variable (i.e., the identified variable does not directly correspond to one of the data fields of the data records), a data lineage submodule 130 in the coverage analysis module 128 tracks the derivation of the variable through the logic of the application 106 to identify the input variable(s) from which the identified variable is derived. The coverage analysis module 128 then identifies the corresponding data field(s) and values or ranges of values for the data field. For example, if a logic rule in the application 106 executes when the value of a variable y is 2, the data lineage submodule 130 may determine that y is derived via logical steps in the application from a logical combination of three input variables that correspond to input data fields gender, inc_range, and state. By following the logical derivation of the variable y, the values of the data fields gender, inc_range, and state that cause y=2 can be determined. For instance, the logic rule y=2 may be satisfied when gender=F, inc_range=high, and state=ME, NH, VT, MA, RI, or CT. The determination is provided to the subsetting module 120, which specifies an additional subsetting rule such that subsequent subsets of data records provided to the application 106 will include data sufficient to cause the y=2 logic rule to execute. As another example, a logic rule may execute when the values of two variables have a particular relationship, such as when values of variables corresponding to the data fields firstname and lastname are equal.

In some examples, the results of the coverage analysis are also provided to the user 122. The user may provide additional subsetting rules to the subsetting module 120 or may modify previously provided subsetting rules. The user may also provide additional input to the profiling module 126 to modify the input previously provided to the profiling module.

In some examples, even the complete set(s) of data records does not include data sufficient to satisfy a logic rule in the application 106. For instance, the application 106 may include a logic rule that executes only when the value for the data field income is greater than five million dollars. If no data record exists in the set for which income>$5,000,000, then no subset of data records will cause that logic rule to execute. To identify such deficiencies in the complete data set, in some examples, the application may be executed one or more times using all of the data records as input. The resulting report identifies rules that cannot be covered regardless of the subset of data records that are selected for input.

Figure 2A:
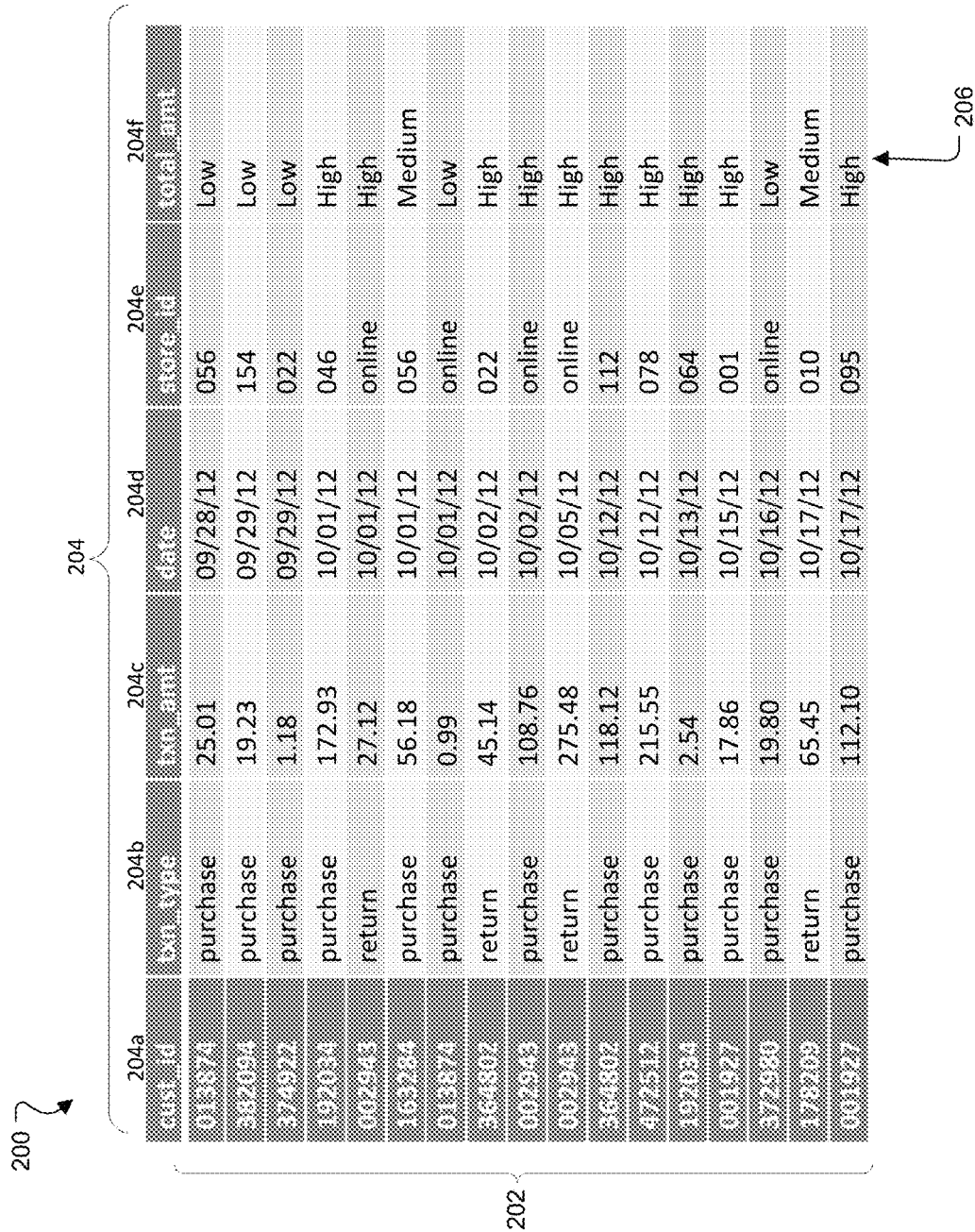
FIG. 2A is a small portion of an example set of customer transaction records.

The operation of the subsetting module 120 and the profiling module 126 will be described with reference to example sets 200, 252 of data records shown in FIGS. 2A and 2B. FIG. 2A is an example of a small portion of a set 200 of customer transaction records. Each customer transaction record 202 has several data fields 204, including, e.g., a customer identifier (cust_id) 204a, a transaction type (txn_type) 204b, a transaction amount (txn_amt) 204c, a transaction date (date) 204d, and a store identifier (store_id) 204e. Other data fields may also be included. FIG. 2B is an example of a small portion of a set 250 of demographic records. Each demographic record 252 has several data fields 254, including, e.g., a customer identifier (cust_id) 254a, a customer address (address, state, ZIP) 254b, 254c, 254d, a customer income (income) 2054e, and a customer gender (gender) 254f. Other data fields may also be included. The operations of the profiling module 126 and the subsetting module 120 are not restricted to these example data sets and apply similarly to other types of data sets.

The subsetting module 120 may select a subset of data records according to one or more types of subsetting rules. Some example subsetting rules are as follows:

Filtering.

In some examples, the subsetting module 120 selects a subset of data records according to a filter. For instance, the filter may specify that all data records having a particular value for a given data field are to be selected. For example, the filter may specify that all demographic records from the set 250 having state (data field 254c)="MA" are to be selected for the subset. The filter may be specified by the user, the profiling module 126, and/or the coverage analysis module 128.

In some examples, the subsetting module 120 selects a subset of data records according to a rules-based filter in which data records are eliminated based on a value of a given data field. For example, the filter may specify that data records for which store_id (data field 204e)="online" are to be eliminated from the subset. The rules-based filter may be specified by the user 122, the profiling module 126, and/or the coverage analysis module 128.

Target Data Fields.

In some examples, the subsetting module 120 selects a subset of data records based on one or more target data fields. Target data fields are e.g., data fields that are likely to be related to variables of the application. For example, if a particular application that operates on customer transaction records tracks transaction type (i.e., purchase or return) by store location, the developer of the application may identify the data fields txn_type (data field 204c) and store_id (data field 204e) as target data fields. In some cases, the subsetting module 120 may identify a target data field based on characteristics of the data field, such as a cardinality of the data field, as indicated in a profile of the data records. In some cases, the coverage analysis module 128 may identify a target data field based on a relationship between a variable of the application and a data field. A data field of low cardinality (e.g., data fields with cardinality less than a threshold cardinality) may be identified as a target data field, even if the profiling module 126 has little or no other information about the content of the data field and how that content may relate to an application. The threshold cardinality may be specified by a user or may be determined automatically by the profiling module. For instance, based on a profile of the set 350 of demographic records, the data field state may be identified as a target data field provided the threshold cardinality is set to at least fifty.

Figure 3:
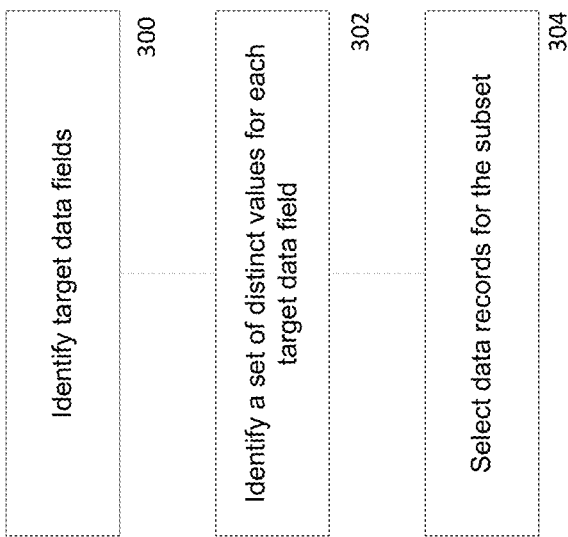
FIG. 3 is a flow chart of an example process for selecting a subset of data records based on target data fields.

FIG. 3 is a flow chart of an example process for selecting a subset of data records based on target data fields. One or more target data fields are identified (300), e.g., based on information included in a profile of the data records, information from a user, information from the coverage analysis module 128, etc. A set of distinct values for each target data field in the set of records is identified (302). Data records are selected for the subset (304) such that each distinct value for each target data field is included in at least one data record in the subset. In an example, the state data field and the gender data field are identified as target data fields for the set 250 of demographic records. The set 250 of data records is analyzed to identify fifty distinct values for state and two distinct values for gender. Data records are selected such that each of the fifty values for state and each of the two values for gender are included in at least one data record in the subset. In some examples, the subsetting rule may specify a number of times that each distinct value for each target data field is included in the subset (e.g., one time, ten times, fifty times, etc.).

Subsetting based on target data fields does not necessarily imply that every combination of each value of each data field is represented in the subset. For instance, a subset of data records in which each of the fifty values for state and each of the two values for gender are included may contain only fifty data records. In some examples, the target data field is a constructed field, such as a pseudofield (e.g., constructed by the profiling module, as described below), and depends on one or more data fields within the same record or across different records.

Data Classification.

In some examples, a subset of data records is selected based on a classification of data in one or more target data fields of a data record. For instance, a subsetting rule may identify a target data field and specify distinct ranges ("bins") of values by which the values of the target data field can be classified. Data records are selected for the subset based on the bins of the target data field rather than the precise values of the target data field. In an example, the data field income in the set 250 of demographic records is identified as a target data field. Three bins are designated: "low" (income<$50,000), "medium" (income between $50,000 and $150,000), and "high" (income>$150,000). The value of the income data field in each data record considered by the subsetting module 120 for inclusion in the subset is classified as low, medium, or high; and data records are selected such that each of the three bins of income is included in at least one data record in the subset. In some examples, values of a data field are classified (e.g., by the profiling module) and a pseudofield for each data record is populated with the corresponding classified value (e.g., the data field inc_range 256). In these examples, the pseudofield is treated as a target data field and data records are selected such that each distinct value for the pseudofield is included in at least one data record in the subset. The data field to be classified, the number of bins, and/or the range of values for each bin may be specified by the user 122 or identified automatically by the profiling module 126 and/or the coverage analysis module 128.

Combinatorics.

In some examples, a subset of data records is selected according to a combinatorics rule, which may specify combinations of two or more other subsetting rules. For instance, a combinatorics rule may identify two target data fields and specify that all possible combinations of all values of each of the two target data fields be included in at least one data record in the subset. An example combinatorics rule may identify the data fields inc_range and gender as target data fields and specify that all possible combinations of those two data fields be included in the subset. The subset satisfying this combinatorics rule would include six data records (i.e., low+female, low+male, middle+female, middle+male, high+female, high+male). In contrast, without the combinatorics rule, the specification of inc_range and gender as target data fields could be satisfied with as few as three records (e.g., low+female, middle+male, high+female). In some examples, a subsetting rule may specify a combinatoric combination of two or more target data fields and one or more other target data fields outside of the combinatoric combination. For instance, a subsetting rule may specify inc_range and gender as target data fields to be taken in combinatoric combination, and may also specify state as a target data field outside of that combination. More complex combinations are also possible. The target data fields and the specific type of combination may be specified by the user 122 or identified automatically by the profiling module 126 and/or the coverage analysis module 128.

Relationships Among Data Records.

In some examples, a subset of data records is selected according to a relationship among data records within a set of data records or across different sets of data records. A subsetting rule may specify a join key such that if one data record is selected for the subset, other data records that are related to that data record via the join key are also selected for the subset. For instance, a subsetting rule may identify the data field cust_id as a join key relating data records within the set 200 of customer transaction records and between the set 200 and the set 250 of demographic records. For each data record from either set that is selected for the subset (e.g., according to another subsetting rule), other data records that share the same value for cust_id as the selected data record are also selected for the subset. By selecting data records according to relationships, the subset will contain, e.g., data records for all transactions for a particular customer as well as demographic records for that customer. The relationship may be specified by the user 122 or identified automatically by the profiling module 126 and/or the coverage analysis module 128.

In some examples, the relationship among data records may be based on one or more characteristics of the data records. For instance, a data record of interest may be identified (e.g., a data record corresponding to a fraudulent credit card transaction). A corresponding subsetting rule may then specify that the subset is to include fifty other data records having characteristics similar to the identified data record of interest, e.g., to help identify other instances of fraud in the data records.

Other subsetting rules may also be specified. For instance, data record counts may be specified (e.g., the subset is to include at least 100 records for which txn_type="purchase"). Statistical parameters may be specified (e.g., the subset is to include all data records for which txn_type="purchase" and 15% of data records for which txn_type="return"). Numerical parameters may be specified (e.g., the subset is to include at least a specified number of data records per million data records in the set of data records). These subsetting rules may be specified by the user 122 and/or formulated by the subsetting module 120 based on an analysis of the profile (generated by the profiling module 126) and/or the results of an analysis of the execution (provided by the coverage analysis module 128).

In some examples, multiple subsetting rules may be applied to a set of data records. In some cases, application of these multiple subsetting rules may result in some data records being selected multiple times for the subset. A deduplication rule may be applied to the selected data records to remove any data records that appear more than once in the subset.

In some examples, subsetting rules are formulated based on an analysis of the profile generated by the profiling module 126. The profiling module 126 may analyze the data records with no input from outside sources or with input from the user 122 and/or the coverage analysis module 128. Some examples of profiling analyses are as follows:

Cardinality.

In some examples, the profiling module 126 identifies the cardinality of the data field (i.e., the number of distinct values for the data field across all of the data records of a set). For instance, when profiling the set 300 of customer transaction records, the profiling module may identify txn_type as a data field of low cardinality (only two distinct values in all the data records of the set 300). When profiling the set 350 of demographic records, the data field state may be identified as a data field with cardinality fifty, provided the threshold cardinality is set to at least fifty. The cardinality of some or all of the data fields, may be used by the subsetting module 120 to specify a subsetting rule.

Classification.

In some examples, the profiling module 126 classifies data in a data field. For instance, the profiling module may identify distinct ranges ("bins") of values by which the values of a high cardinality data field can be classified. As classified, the data field has a lower cardinality and thus may be identified as a target data field as described above. In some cases, the profiling module classifies the value for the data field of each record as it analyzes the record but does not store the classification. In some cases, the profiling module generates a pseudofield for each record in which the bin corresponding to value of the data field is stored. As an example, the data field income in the set 350 of demographic records is high cardinality. The profiling module classifies the income value for each record into one of three bins (high, medium, or low) and generates a pseudofield inc_range 356 to store the categorized data. The pseudofield 356 has cardinality three and as such may be identified as a target data field by the subsetting module 120 where the high cardinality data field income may not have been identified as a target data field. In some examples, the profiling module recognizes that a high cardinality data field can be classified automatically. In some examples, a user identifies a data field for classification and may also specify the number of bins and the ranges of values that fall within each bin. In some examples, the user specifies characteristics of data fields to be classified without identifying a specific data field (e.g., the user may specify that any data field having numeric values and having cardinality between 10 and 100 is to be categorized into quartiles).

Relationships Among Data Fields.

In some examples, the profiling module 126 determines relationships among data fields within a single data record. For instance, if a first data field in a data record depends on a second data field within each data record, then only one of the first data field and the second data field needs to be considered as a target data field. For example, the data field state and the data field ZIP are related (i.e., the value for ZIP depends on the value for state). Based on an indication of such a relationship in the profile, the subsetting module 120 may consider only one of the two related data fields as a potential target data field. More complex relationships among data fields can also be identified and used by the subsetting module 120 in identifying target data fields. The profiling module may be guided by user input, e.g., by user specification of data fields that are likely to be related.

Relationships Among Data Records.

In some examples, the profiling module 126 determines relationships among different data records within a set of data records or across different sets of data records. For instance, the profiling module may recognize that some data records within a set are linked via a common value of a data field. For example, the set 300 of customer transaction records may include multiple data records corresponding to transactions by the same customer. These data records are linked via a common value for cust_id (i.e., a join key). The profiling module may also recognize that a first data record within a first set is related via a common value of a data field to a second data record within a second set. For example, a data record in the set 300 of customer transaction records may be linked to a data record in the set 350 of demographic records via the data field cust_id (i.e., a transaction record for a particular customer can be linked to the demographic record for that customer). The profiling module may be guided by user input, e.g., by user specification of data fields that are likely to link data records. The profiling module may also be guided to identify join keys or other relationships via an analysis of the schema of a relational database associated with the set(s) of data records. In some examples, the profiling module 126 determines relationships among data records and presents the relationships to the user, who may then use the information about relationships to specify subsetting rules to the subsetting module 120.

Based on an indication of such a relationship among data records in the profile, the subsetting module 120 may specify the join key as part of a subsetting rule. Under such a subsetting rule, if one data record is selected for the subset, other data records related to that data record via the join key are also selected for the subset (e.g., if one data record having a given cust_id is selected for the subset, other data records having the same cust_id are also selected).

Pseudofields.

In some examples, the profiling module 126 generates a new pseudofield with values determined by manipulation of values for one or more data fields in related data records and identifies the pseudofield as a target data field. The value for the pseudofield may be a combination of values for one or more data fields in data records that are related via a join key. For instance, the value for the pseudofield may be an accumulated value, e.g., an accumulation, such as a sum, count, or other accumulation, of all values for a first data field for data records that are related via a common value of a second data field. The value for the pseudofield may also be a classification of the accumulated value. For example, to address logic in the application that performs an action depending on a total transaction amount for a given customer, a pseudofield total_amt 306 is generated in the set 300 of customer transaction records. The value for the pseudofield total_amt for a data record having a given cust_id value is determined by summing the values for the txn_amt field for all data records having that cust_id value and classifying the sum into one of three bins (high, medium, or low). The pseudofield may then be identified by the subsetting module as a target data field.

Figure 4:
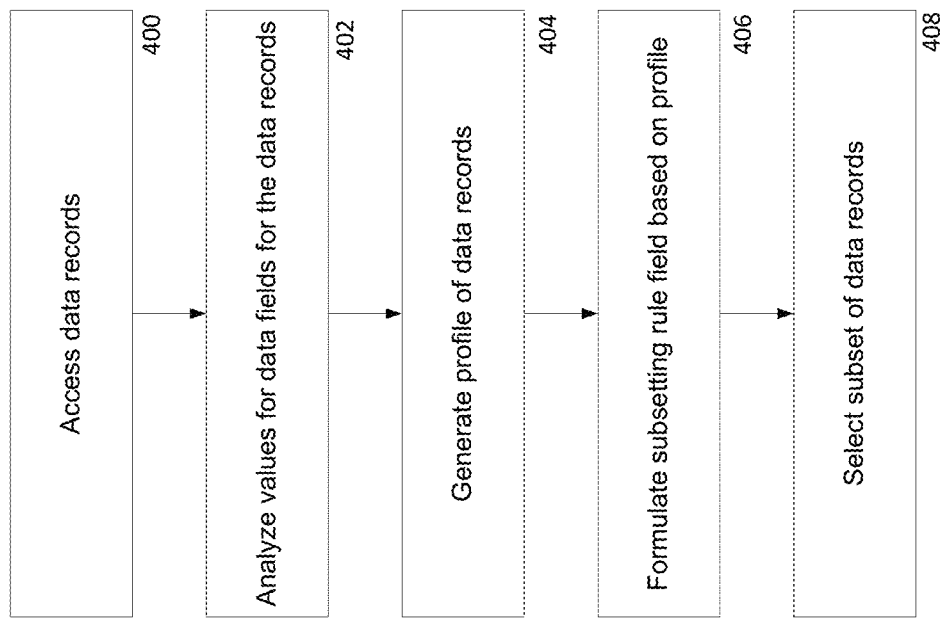
FIG. 4 is a flow chart of an example process for selecting data records.

Referring to FIG. 4, in an example process, a plurality of data records are accessed (400). Each data record has a plurality of data fields. Values for one or more of the data fields for at least some of the plurality of data records are analyzed (402). A profile of the plurality of data records is generated (404) based on the analyzing. A profile of a plurality of data records includes information characterizing the data in the set of data records. At least one subsetting rule is formulated based on the profile (406). A subsetting rule is a specification of a rule by which a subset of data records from the plurality of data records is to be selected. A subset of data records is selected (406) based on the at least one subsetting rule. For instance, the subset of data records may be selected based on values of a target data field and/or based on a relationship between data records that are related via values of a data field.

Figure 5:
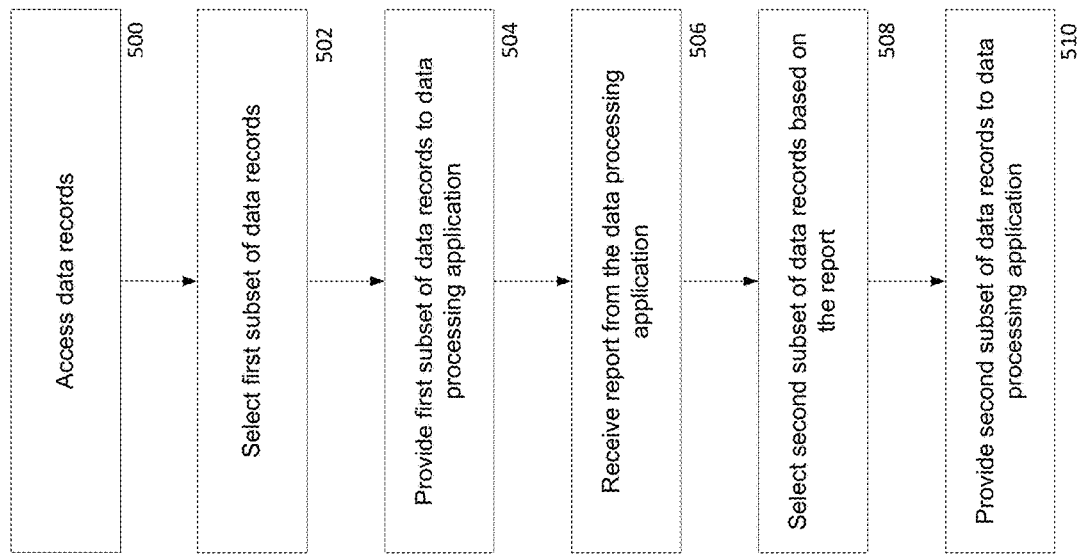
FIG. 5 is a flow chart of another example process for selecting data records.

Referring to FIG. 5, in another example process, a plurality of data records are accessed (500). Each data record has a plurality of data fields. A first subset of data records is selected from the plurality of data records (502). The first subset of data records is provided to a data processing application (504), such as an application under test. The application implements a variety of rules. Rules in a data processing application are executable portions of the application whose execution depends on (e.g., is triggered by) the value of one or more variables. A report is received (506) indicative of a number of times at least one of the rules was executed by the data processing application. Based on the report, a second subset of data records is selected (508) from the plurality of data records. The second subset of data records is provided to the data processing application (510). For instance, the second subset is selected such that the previously non-executed rules may be executed, or such that certain rules may be executed.

In some examples, new data records can be generated based on the profiling analysis conducted by the profiling module 126. For instance, the profiling analysis reveals relationships among data fields within and among data records and ranges of possible values for the data fields in an existing set of data records. A new data record can be constructed in which at least some of the data fields are populated with values calculated or determined from the information about existing data records. Test data generation may be used, for instance, when there are no data records in the source data set that will cause a particular logic rule in an application to execute, e.g., a logic rule that requires income>$10,000,000; or a logic rule that requires a complex combination of particular values of multiple data fields where all of the required values are not represented in the set of data records. Test data generation may also be used to generate a new data set whose profile matches the profile of an original data set. For instance, a new data set may be generated by randomizing the data of the original data set to preserve the privacy of the original data records.

In some examples, the approaches described above are implemented in an execution environment which may be hosted on one or more general-purpose computers under the control of a suitable operating system, such as the UNIX operating system. For example, the execution environment can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

In some cases, the approaches described above are implemented by a system for developing applications as dataflow graphs that include vertices (representing components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference. A system for executing such graph-based computations is described in U.S. Pat. No. 5,566,072, EXECUTING COMPUTATIONS EXPRESSED AS GRAPHS, incorporated herein by reference. Dataflow graphs made in accordance with this system provide methods for getting information into and out of individual processes represented by graph components, for moving information between the processes, and for defining a running order for the processes. This system includes algorithms that choose interprocess communication methods (for example, communication paths according to the links of the graph can use TCP/IP or UNIX domain sockets, or use shared memory to pass data between the processes).

The approaches described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method for selecting data records to cause execution of a processing rule during testing of a data processing application, the method including:

obtaining a first set of data records;

processing in a data processing system the first set of data records using a data processing application that includes a processing rule that operates on at least one input value and generates at least one output value, and wherein whether the processing rule is executed by the data processing application during processing of a particular data record depends directly or indirectly on a value in each of one or more data fields of the particular data record;

receiving execution information indicative of a number of times the processing rule was executed in connection with processing of the first set of data records;

obtaining a second set of data records;

characterizing values in one or more data fields of each of the data records in the second set;

determining an identification criterion that identifies a particular one of the data fields of the data records in the second set as a target data field, the identification criterion being based on (i) the characterization of the values in the one or more data fields of each of the data records in the second set and (ii) the execution information indicative of the number of times the processing rule was executed in connection with processing the first set of data records;

applying the identification criterion to select one or more data records from the second set of data records based on values in the target data field; and processing the selected one or more data records using the data processing application.

2. The method of claim 1, including identifying a particular one of the data fields of the data records in the second set as a target data field based on a cardinality of each of one or more of the data fields of the data records in the second set.

3. The method of claim 2, wherein there are multiple distinct values in the target data field across the data records in the second set, and wherein selecting one or more data records from the second set of data records includes selecting at least one data record having each of the distinct values in the target data field.

4. The method of claim 1, wherein the target data field is a first target data field, and including identifying a second particular one of the data fields of the data records in the second set as a second target data field.

5. The method of claim 4, wherein selecting one or more data records from the second set of data records includes selecting the data records based on a combination of values in the first target data field and values in the second target data field.

6. The method of claim 5, wherein there are multiple distinct values in the first target data field across the data records in the second set and multiple distinct values in the second target data field across the data records in the second set, and wherein selecting one or more data records from the second set of data records includes selecting the data records based on combinations of the distinct values in the first target data field and the distinct values in the second target data field.

7. The method of claim 1, wherein characterizing values in one or more data fields includes identifying a first data field having a value that indicates a relationship among two or more data records in the second set of data records.

8. The method of claim 7, wherein selecting one or more data records from the second set of data records includes: selecting a first data record; identifying one or more second data records related to the first data record based on the value in the first data field of the first data record; and selecting the one or more second data records.

9. The method of claim 7, including determining an accumulated value for the first data record based on a value in a second data field of the first data record and a value in the second data field for each of the two or more data records that are related to the first data record; generating a new field for the first data record; and populating the new field with the accumulated value.

10. The method of claim 9, wherein determining the accumulated value includes determining the accumulated value based on a sum of the value in the second data field of the first data record and the value in the second data field for each of the two or more data records that are related to the first data record.

11. The method of claim 9, wherein selecting one or more data records from the second set of data records includes selecting the one or more data records based on the accumulated value in the new field for each of one or more data records in the second set of data records.

12. A system for selecting data records to cause execution of a processing rule during testing of a data processing application, the system including:
at least one processor configured to:
obtain a first set of data records;
process in a data processing system the first set of data records using a data processing application that includes a processing rule that operates on at least one input value and generates at least one output value, and wherein whether the processing rule is executed by the data processing application during processing of a particular data record depends directly or indirectly on a value in each of one or more data fields of the particular data record;
receive execution information indicative of a number of times the processing rule was executed in connection with processing of the first set of data records;
obtain a second set of data records;
characterize values in one or more data fields of each of the data records in the second set;
determine an identification criterion that identifies a particular one of the data fields of the data records in the second set as a target data field, the identification criterion being based on (i) the characterization of the values in the one or more data fields of each of the data records in the second set and (ii) the execution information indicative of the number of times the processing rule was executed in connection with processing the first set of data records;
applying the identification criterion to select one or more data records from the second set of data records based on values in the target data field; and
process the selected one or more data records using the data processing application.

13. The system of claim 12, wherein the at least one processor is configured to identify a particular one of the data fields of the data records in the second set as a target data field based on a cardinality of each of one or more of the data fields of the data records in the second set.

14. The system of claim 13, wherein there are multiple distinct values in the target data field across the data records in the second set, and wherein selecting one or more data records from the second set of data records includes selecting at least one data record having each of the distinct values in the target data field.

15. The system of claim 12, wherein the target data field is a first target data field, and including identifying a second particular one of the data fields of the data records in the second set as a second target data field.

16. The system of claim 15, wherein selecting one or more data records from the second set of data records includes selecting the data records based on a combination of values in the first target data field and values in the second target data field.

17. The system of claim 16, wherein there are multiple distinct values in the first target data field across the data records in the second set and multiple distinct values in the second target data field across the data records in the second set, and wherein selecting one or more data records from the second set of data records includes selecting the data records based on combinations of the distinct values in the first target data field and the distinct values in the second target data field.

18. The system of claim 12, wherein characterizing values in one or more data fields includes identifying a first data field having a value that indicates a relationship among two or more data records in the second set of data records.

19. The system of claim 18, wherein selecting one or more data records from the second set of data records includes: selecting a first data record; identifying one or more second data records related to the first data record based on the value in the first data field of the first data record; and selecting the one or more second data records.

20. The system of claim 18, wherein the at least one processor is configured to determine an accumulated value for the first data record based on a value in a second data field of the first data record and a value in the second data field for each of the two or more data records that are related to the first data record; generating a new field for the first data record; populating the new field with the accumulated value.

21. The system of claim 20, wherein selecting one or more data records from the second set of data records includes selecting the one or more data records based on the accumulated value in the new field for each of one or more data records in the second set of data records.

22. A non-transitory computer readable medium storing instructions for causing a computer system to select data records to cause execution of a processing rule during testing of a data processing application, the instructions causing the computer system to:
obtain a first set of data records;
process in a data processing system the first set of data records using a data processing application that includes a processing rule that operates on at least one input value and generates at least one output value, and wherein whether the processing rule is executed by the data processing application during processing of a particular data record depends directly or indirectly on a value in each of one or more data fields of the particular data record;
receive execution information indicative of a number of times the processing rule was executed in connection with processing of the first set of data records;
obtain a second set of data records;
characterize values in one or more data fields of each of the data records in the second set;
determine an identification criterion that identifies a particular one of the data fields of the data records in the second set as a target data field, the identification criterion being based on (i) the characterization of the values in the one or more data fields of each of the data records in the second set and (ii) the execution information indicative of the number of times the processing rule was executed in connection with processing the first set of data records;
applying the identification criterion to select one or more data records from the second set of data records based on values in the target data field; and
process the selected one or more data records using the data processing application.

23. The non-transitory computer readable medium of claim 22, the instructions causing the computer system to identify a particular one of the data fields of the data records in the second set as a target data field based on a cardinality of each of one or more of the data fields of the data records in the second set.

24. The non-transitory computer readable medium of claim 23, wherein there are multiple distinct values in the target data field across the data records in the second set, and wherein selecting one or more data records from the second set of data records includes selecting at least one data record having each of the distinct values in the target data field.

25. The non-transitory computer readable medium of claim 22, wherein the target data field is a first target data field, and including identifying a second particular one of the data fields of the data records in the second set as a second target data field.

26. The non-transitory computer readable medium of claim 25, wherein selecting one or more data records from the second set of data records includes selecting the data records based on a combination of values in the first target data field and values in the second target data field.

27. The non-transitory computer readable medium of claim 26, wherein there are multiple distinct values in the first target data field across the data records in the second set and multiple distinct values in the second target data field across the data records in the second set, and wherein selecting one or more data records from the second set of data records includes selecting the data records based on combinations of the distinct values in the first target data field and the distinct values in the second target data field.

28. The non-transitory computer readable medium of claim 22, wherein characterizing values in one or more data fields includes identifying a first data field having a value that indicates a relationship among two or more data records in the second set of data records.

29. The non-transitory computer readable medium of claim 28, wherein selecting one or more data records from the second set of data records includes: selecting a first data record; identifying one or more second data records related to the first data record based on the value in the first data field of the first data record; and selecting the one or more second data records.

30. The non-transitory computer readable medium of claim 28, the instructions causing the computer system to determine an accumulated value for the first data record based on a value in a second data field of the first data record and a value in the second data field for each of the two or more data records that are related to the first data record; generating a new field for the first data record; populating the new field with the accumulated value.

31. The non-transitory computer readable medium of claim 30, wherein selecting one or more data records from the second set of data records includes selecting the one or more data records based on the accumulated value in the new field for each of one or more data records in the second set of data records.

32. A system for selecting data records to cause execution of a processing rule during testing of a data processing application, the system including:
means for obtaining a first set of data records;

means for processing in a data processing system the first set of data records using a data processing application that includes a processing rule that operates on at least one input value and generates at least one output value, and wherein whether the processing rule is executed by the data processing application during processing of a particular data record depends directly or indirectly on a value in each of one or more data fields of the particular data record;

means for receiving execution information indicative of a number of times the processing rule was executed in connection with processing of the first set of data records;

means for obtaining a second set of data records;

means for characterizing values in one or more data fields of each of the data records in the second set;

means for determining an identification criterion that identifies a particular one of the data fields of the data records in the second set as a target data field, the identification criterion being based on (i) the characterization of the values in the one or more data fields of each of the data records in the second set and (ii) the execution information indicative of the number of times the processing rule was executed in connection with processing the first set of data records;

means for applying the identification criterion to select one or more data records from the second set of data records based on values in the target data field; and means for processing the selected one or more data records using the data processing application.

* * * * *